United States Patent
Xu

(10) Patent No.: US 6,643,638 B1
(45) Date of Patent: Nov. 4, 2003

(54) SYSTEM AND METHOD FOR STORING AND COMPUTING DATA AND FUNCTIONS

(76) Inventor: Kevin Houzhi Xu, 164 W. High St., Bound Brook, NJ (US) 08805

(*) Notice: Subject to any disclaimer, the term of this patent is extended or adjusted under 35 U.S.C. 154(b) by 0 days.

(21) Appl. No.: 09/536,343

(22) Filed: Mar. 25, 2000

(51) Int. Cl.⁷ .............................................. G06F 17/30
(52) U.S. Cl. ..................... 707/3; 707/2; 707/9; 707/10; 707/100
(58) Field of Search ................. 707/1–5, 10, 104.1, 707/203, 201; 709/223, 224; 370/235, 236

(56) References Cited

U.S. PATENT DOCUMENTS

| | | | | |
|---|---|---|---|---|
| 4,251,861 A | * | 2/1981 | Mago .......................... | 364/200 |
| 4,558,413 A | * | 12/1985 | Schmidt et al. ............. | 364/300 |
| 5,995,958 A | * | 11/1999 | Xu ................................ | 707/3 |
| 6,094,652 A | * | 7/2000 | Faisal ............................ | 707/5 |
| 6,161,103 A | * | 12/2000 | Rauer et al. .................... | 707/4 |
| 6,173,283 B1 | * | 1/2001 | Kasso et al. ................... | 707/10 |

OTHER PUBLICATIONS

Witold Liwin: An overview of the multidatabase system, 1985, ACM Press, ISSN: 0–89791–170–9, pp. 524–533.*

Timothy Thomasma et al.: Hierarchical, modular simulation modeling in icon–based simulation program generators for manufaturing, 1988, ACM Press, ISSN: 0–911801–42–1, pp. 254–262.*

Paul Hudak: Conception, Evolution, and Application of Functional Programming languages, Sep. 1989, ACM, vol. 21, No. 3, pp. 359–411.*

* cited by examiner

*Primary Examiner*—Hosain T. Alam
*Assistant Examiner*—Jacques Veillard

(57) ABSTRACT

A computer system and method is to store and manage data and to construct application programs. This system accepts uniform input expressions db-terms, by which the stored data can be referenced and user queries can be expressed. A database is a collection of nodes that are connected by a set of directed links. There are three types of links. By ignoring one type of the links, the database can be viewed as a set of trees. All the nodes in databases are viewed as functions; all the db-terms can be computed to their values if they existed against databases and according to computing rules. The tree structures embedded in databases illustrate the dependent relationships among the data, and provide build-in functions in manipulating the database and a theoretical guideline of data distribution. The function-argument-value relationships among the nodes in databases provide a theoretical guideline for a set of useful built-in functions.

4 Claims, 9 Drawing Sheets

Fig. 2

Rules of constructing valid input expressions - db-terms

120 — Label: Numerals, Character Strings, and Binary Strings, etc. are db-terms.

121 — Combination: If M and N are two db-terms, then M N is a db-term.

122 — Abstraction: If M is a db-term, and x a label, then λx. M, or λx:[bool]. M is a db-term.

123 — Binary Operation: If op is a built-in binary operator, and M, N are two db-term, then (M op N) is a db-term.

124 — Assignment: If M and N are two db-terms, then M := N is a db-term.

125 — Set: If M1, M2, ..., Mn are db-terms, then {M1, M2, ..., Mn} is a db-term.

Fig. 3

Examples of db-terms

Label: 123, 123.4, College, fac, SQ.

Combination: College Admin (SDD John) Major Head

Abstraction: λn. n * fac (n - 1).

Boolean operation: x <vf y ^ y = z.

Assignment: SQ 2 := 4.

Set: {SQ 2, SQ 3}.

Select (x y z) where (x <a y ^ y = z).

Example I of Functions

Example II of Functions

Example III of Functions

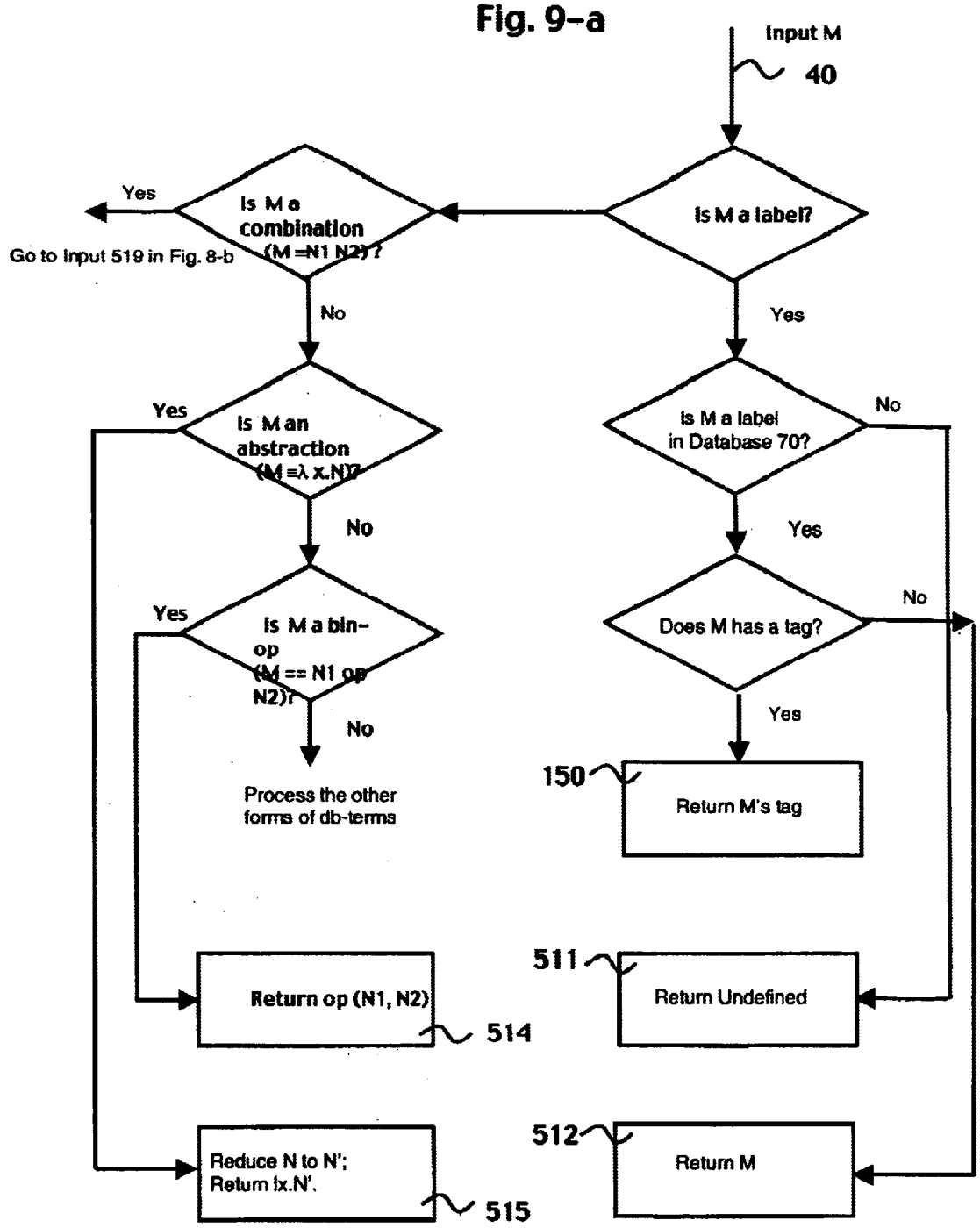

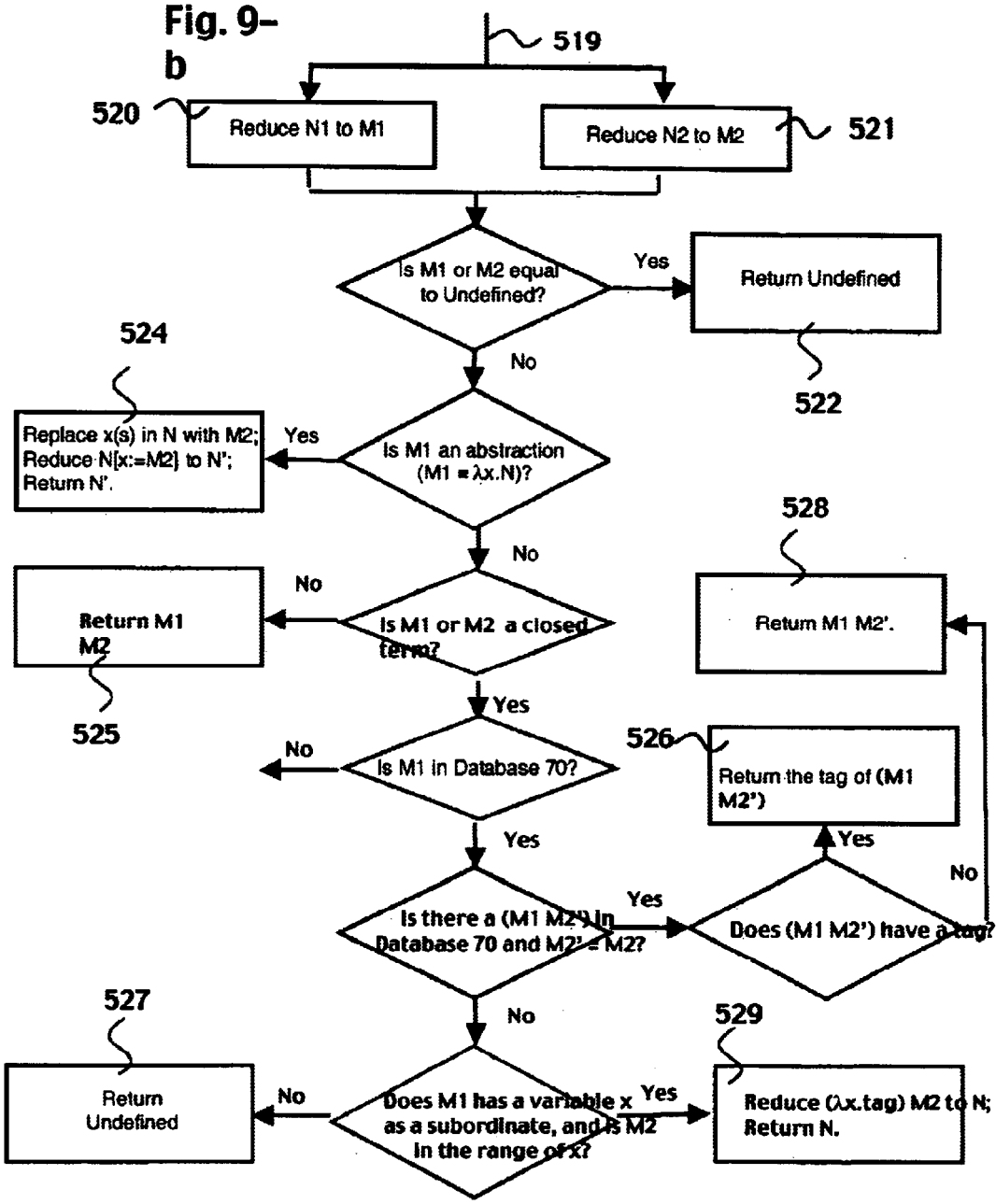
Fig. 9-b 70-d

SYSTEM AND METHOD FOR STORING AND COMPUTING DATA AND FUNCTIONS

BACKGROUND OF THE INVENTION

1. Field of the Invention

This invention is related to programming languages and database management systems by which arbitrary computing applications, especially information related applications such as Database Applications, Data Discovery and Mining, Artificial Intelligent, Knowledge-based reasoning systems and Web-based applications can be developed.

2. Description of the Prior Art

Database management systems are the cores of almost all of the computing applications systems. The way of managing data, called data model normally in the database research area, is a key factor to determine the productivity and the quality of developing and maintaining database application software. Even more, it determines the success or the failure of a complex database application development regardless the cost.

Finding a better data model has been a challenging research activity. The relational data model is the most popular data model widely spreading in the industry. However, it has a lot of limitations in presenting data and manipulating data. Many new data models have been proposed after the relational data model. The examples are objected-oriented data models as in ??, graph-oriented data models as in Finding a better data model has been a challenging research activity. The relational data model is the most popular data model widely spreading in the industry. However, it has a lot of limitations in presenting data and manipulating data. Many new data models have been proposed after the relational data model. The examples are objected-oriented data models as in "Introduction to Object Oriented Databases" by Won Kim, the MIT Press, 1990, graph-oriented models as in "A Graph-Oriented Object Database Model" by M. Gyssens, J. Paredaens, J. V. Bussche, and D. V. Gucht, in IEEE Transactions on Knowledge and Data Engineering, Vol. 6, No. 4, August 1994, page 572–586, semi-structured data as in "Tutorial: Semistructured Data" by Peter Buneman, in Proceedings of ACM Symposium on Principle of Database Systems, 1997, and the EP data model as in "An introduction to Enterprise-Participant Data Model" by Kevin H. Xu and Bharat Bhargava, in Seventh International Workshop on Database and Expert Systems Applications, September, 1996, Zurich, Switzerland, page 410–417. However, no one claims that it can represent arbitrary data and expressing arbitrary queries. Instead, host programming languages must be used on the top of DBMSs to cover whatever DBMSs can not cover. Obviously, this complicates the database application systems and drastically increases the effort of developing and maintaining database application systems.

A consequence of lacking a fully powered data model is that more and more different ways of representing data have been born and used for different kinds of information applications in industry. The most notable phenomenon recently is that file-based Web data applications and multimedia data applications are developed totally independent from database management systems. Different ways of representing data turn out more and more obstacles for data integration and interoperability.

Programming languages, on the other hand, have the theoretical power to develop arbitrary computing applications including database applications. However, they were not intended to address the specific issues of database applications such as data presentation and data communication. Therefore, it was much more expensive in developing file-based database applications in host programming languages in 1960's before database management system became popular.

To maximize the productivity and the quality of database applications, a uniform framework, no matter it is called either a programming language or a data model, would be significant. The invention in the U.S. Pat. No. 5,995,958 "System and Method for Storing and Managing Functions" issued to Kevin H. Xu has claimed that effectively computable functions including arbitrary data can be expressed by the EP data model. However, the invention presented in the U.S. Pat. No. 5,995,958 didn't allow a leaf node pointing to another node as its value while it should be allowed according to the function theory. As a consequence, some values couldn't be expressed without data duplication. Two nodes representing two different objects in a database may have the same value. The same value would have to be stored twice under each node when a pointer was not available. Because of the lack of a third type of links, many useful relationships among the nodes in a database couldn't be explored, and then many queries cannot be expressed. Further more, there was not a well-defined query language above databases such that the language had a smooth connection with the databases. Finally, assigning an identifier for each node in a database in the invention of the U.S. Pat. No. 5,995,958 didn't precisely follow the function theory. As a consequence, certain data and queries couldn't be appropriately and effectively presented and expressed; and there are more difficulties in implementing the invention.

SUMMARY OF THE INVENTION

This invention expands and corrects the previous invention in U.S. Pat. No. 5,995,958.

First of all, a new type of links has been added. This would allow different nodes to share the same values; and allow nodes to be equally treated as functions in queries and in representing the relationship among nodes.

Secondly, all the non-root nodes don't have to have identifiers (called labels in this invention description). Although most of the nodes in FIGS. 4, 5, and 6 of this invention description have labels displayed inside nodes for readability, the labels and the nodes are actually separated. Therefore, all the data and queries are uniformly expressed.

Thirdly, a set of computing rules against databases and db-terms (similar to the lambda-terms in the lambda calculus) is developed so that arbitrary input will have its output by passing through the computing rules.

Finally, a new set of built-in functions are developed under the guideline of the function/argument/value relationships among nodes. The built-in functions are fixed mechanism embedded in the systems.

BRIEF DESCRIPTION OF THE DRAWINGS

FIG. 2 shows the rules of forming valid db-terms—input expressions.

FIG. 3 gives a few examples of valid db-terms.

FIG. 9-a and FIG. 9-b show the data process 50 primarily including the computing rules 60 in FIG. 1.

DETAILED DESCRIPTION OF THE INVENTION

A preferred embodiment of the invention is Data Server 10 which comprises Receptionist 30, Database and Process 50, and Speaker 100. Receptionist 30 is a unit that receives requests from users or other computing systems through Channel 20. It knows the identities of the senders and informs Speaker 100 the identities.

The Receptionist 30 comprises a scanner and a parser. The scanner receives as inputs streams of arbitrary characters. All the characters, such as the alphabetic letter 'a', digital '4', the special space character ' ', and the newline '\n' in the Ascii character set, for example, are valid characters. The scanner passes a sequence of tokens to the parser. A token is a sequence of characters.

There are two types of tokens. The first is a set of special tokens serving as delimiters in the input 40 to Database and Process 50. As a choice of this invention description, these delimiters comprise '(', ')', '{', '}', ',', '.', 'λ', and ';'. The second type of the tokens, called labels, is the tokens other than the delimiters, such as strings "abc", "College", "1234", and "1234.00" in FIG. 3. A label in this invention can also be a long sequence of arbitrary characters like a binary file.

The scanner of Receptionist 30 may accept requests (input expressions) in different formats through Channel 20. But the parser of Receptionist 30 converts all the formats into the uniform one of a preferred embodiment of this invention. This format, called db-terms, is defined in FIG. 2. Rule 120 in FIG. 2 says that any label is a db-term, such as College, 123, and 123.4 in FIG. 3. Rule 121 says that the combinations of two db-terms are also db-terms. The parentheses in db-terms are the delimiters for grouping sub db-terms, and they could not be written if there is no ambiguity. Rule 122 says that an abstraction λx. M, or λx:[bool]. M, where M is a db-term, called the body of the abstraction; and bool is a boolean binary operation—a special form of db-terms, is a db-term. Rule 123 says that a binary operations (M op N) with a built-in binary operator op is a db-term. Note that the form (M op N) of the binary operations could be expressed by combinations ((op M) N). Rule 124 says that a set of db-terms forms a db-term. This form is typically used in 'select', 'update', 'delete', and 'create' operations. And Rule 125 says that an assignment M:=N is a db-term. This form is typically used in 'update' and 'create' operations. FIG. 3 gives some examples of the db-terms.

There are two primary sub units in Database and Process 50. One is Database 70 storing a set of fixed functions and dynamic data. The second sub unit is Computing Rules 60 which convert db-terms from Channel 40 to their outputs 90 according to the db-terms and the states of Database 70.

Figure 4:
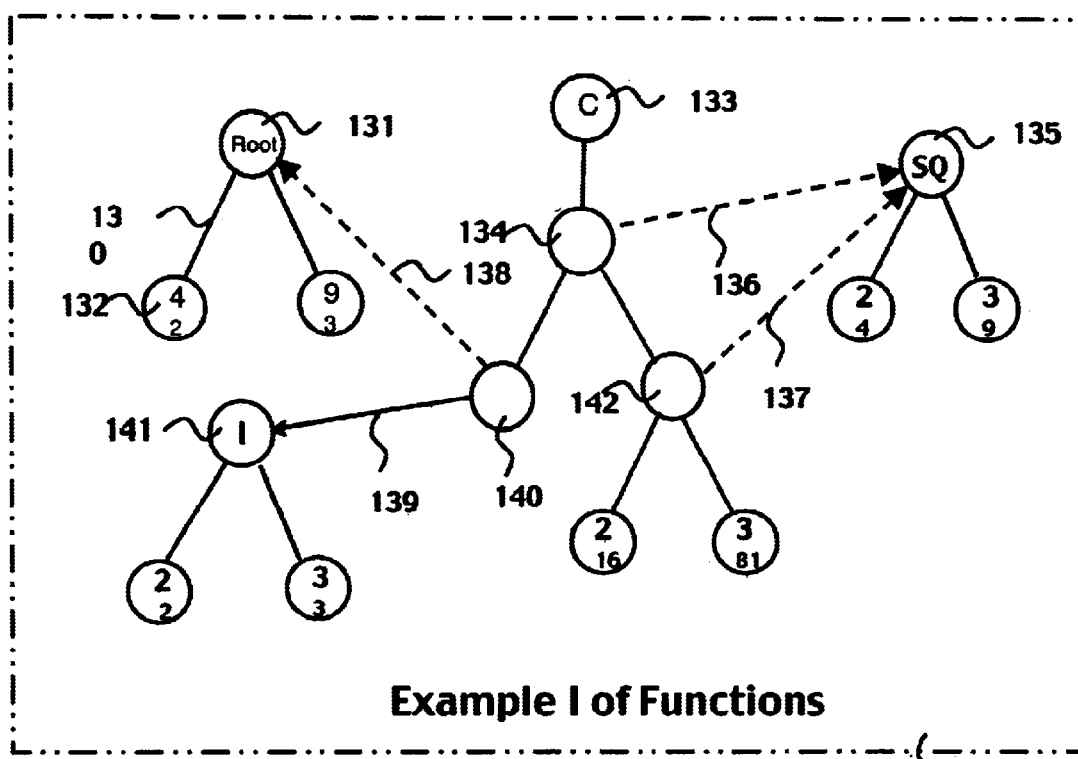
FIG. 4 shows a typical database which stores a composite function, a numeral square function, a numeral root function, and an identity function with finite domains.
Figure 5:
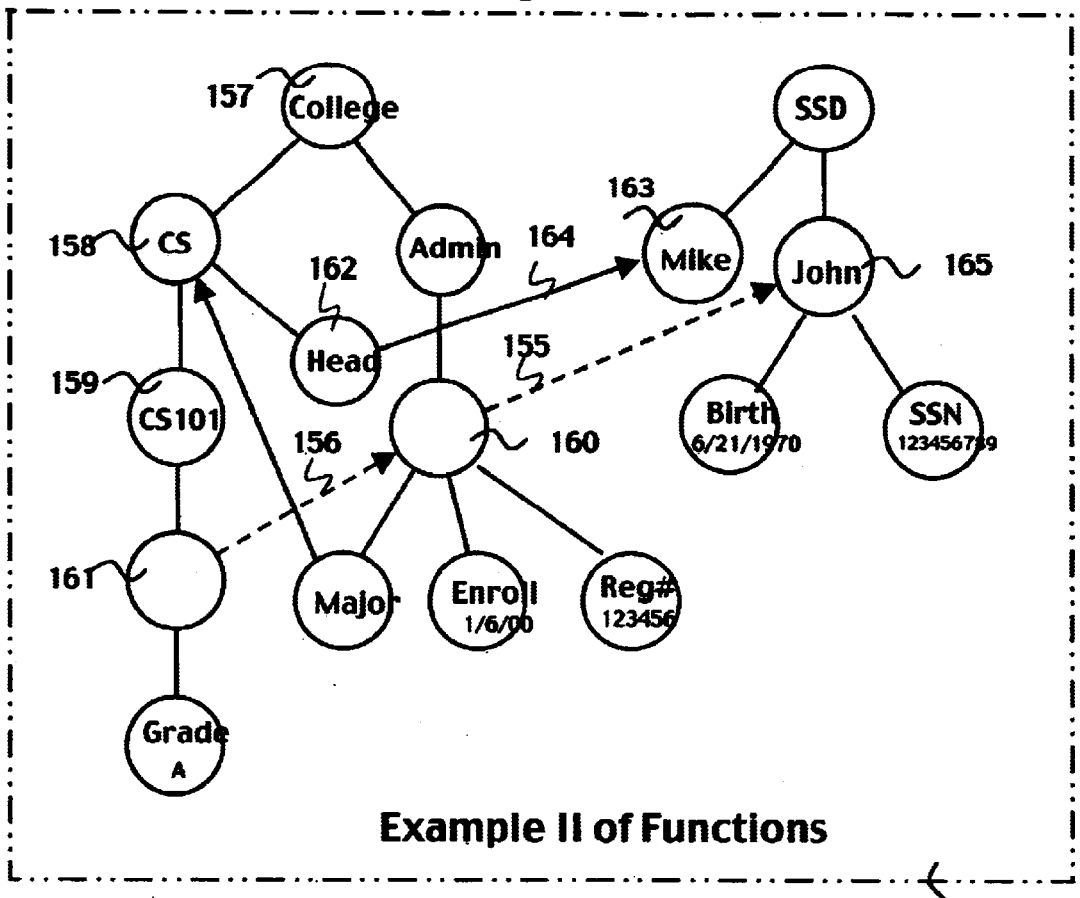
FIG. 5 shows a typical database which stores a school administration information.
Figure 6:
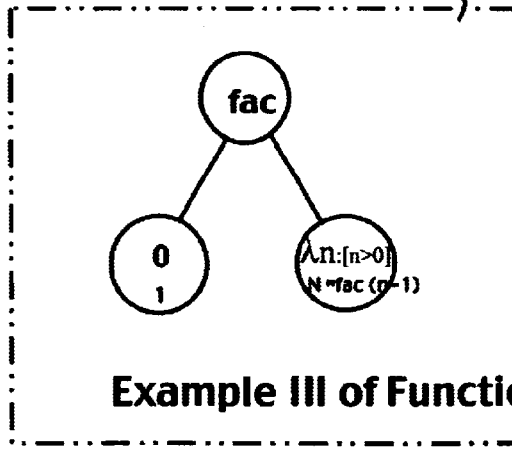
FIG. 6 shows the database which stores the factorial function.

Database 70 is a system with permanent storage 80 which exhibits both the fixed functions and the dynamic data in a uniform data structure. No matter a function or data is fixed or dynamic, it is a node of an instance of the data structure. The data structure is a finite set of nodes connected by the three types of connections: up-down links, solid arrows, and dash arrows. FIGS. 4, 5, and 6 give three examples of this data structure.

A up-down link is a physical reference (such as a one-way pointer or two-way pointers) that connects two nodes together at its two ends as a preferred embodiment of the invention. A link is called the upper link of a node if the link is above the node and is connected with the node; and a link is called the lower link of a node if the link is below the node and connected with the node. A node at the down side of a link is called the down-side node of the link; and a node at the up-side of a link is called the up-side node of the link. Given the node at one side of a link, the node at the other side can be located through the link. For example, all the non-directed links but with up to down orientation in FIGS. 4, 5, and 6 including the link 130 are up-down links. Given the link 130, the node 131 is the up-side node of the link 130; the node 132 is the down-side node of the link 130.

A dash arrow is a physical reference (such as a one-way pointer or two-way pointers) that connects two nodes together at its two ends as a preferred embodiment of the invention. The node at the tail of a dash arrow is called the tail node of the arrow; and the node at the head of the arrow is called the head node of the dash arrow. Given the node at one end of an arrow, the node at the other end can be located through the arrow. For example, all the allows in dash line in FIGS. 4, and 5 including arrows 136, 137, and 138 are dash arrows A solid arrow is a physical reference (such as a one-way pointer or two-way pointers) that connects two nodes together at its two ends as a preferred embodiment of the invention. The node at the tail of a solid arrow is called the tail node of the arrow; and the node at the head of the arrow is called the head node of the arrow. Given the node at one end of an arrow, the node at the other end can be located through the arrow. For example, the arrows 139, 155, and 156 are solid arrows.

A node is an end of an up-down link, solid, or dash arrow; or a joint of more than one up-down link(s), solid arrow(s), and/or dash arrow(s). A node imposes the following constraints on the connected links and/or arrows:

(1). Each end of a link or an arrow is a node.

(2). A node must not have more than one upper link. If there is no upper link, the node is called a root. For example, Root 131 in FIG. 4 and College in FIG. 5 are roots. Given an up-down link, the up-side node is called the superior of the down-side node; and the down-side node is called a subordinate of the up-side node. For example, Node 132 is a subordinate of Node 131; and Node 131 the superior of the Node 132.

(3). A node must not have more than one dash arrow pointing away from it. Given a dash arrow, the head node is called the parent of the tail node; and the tail node is called a child of the parent. For example, Node 134 is a child of Node 135; and Node 135 is the parent of Node 134.

(4). A node may have zero or more than one subordinate (s). If there is no subordinate, a node may have a tag. A node that has a tag is called a leaf node. For example, Nodes 132 and 140 are leaf nodes.

(5). A node may have a label. The label of a node is displayed in the center of the node. For example, the labels of Nodes 131 and 132 are "Root" and "4" respectively. A root shall have a label. A non-root node without label must have a dash arrow pointing away from it. For example, the Node 131 has the label "Root". Node 140 has the dash arrow 138 pointing away from it. As a matter of fact, all the non-root nodes in Database 70 don't have to have labels in the nodes. If this is the case, all the labels are roots; all the non-root nodes will have dash arrows pointing to either label roots or other nodes; and they don't have labels inside the nodes.

(6). Starting from a node, one would never travel back to the same node by taking either up-down links, solid arrows, or dash arrows. And further, the nodes and the links with a single type of the connections in Database 70 form a structure of trees. For example, all the nodes and the up-down links in FIG. 4 form trees; all the nodes and the dash arrows in FIG. 4 form directed trees; and all the nodes and the solid arrows in FIG. 4 form directed trees. Node that a single node without connection with other nodes is also a tree.

(7). Two subordinates under a single superior shall not be convertible as more discussion will be done about it late in this invention description.

The tag of a node can be one of the followings:

(1). A node connected by the head of a solid arrow from the given node. For example, Node 140 has Node 141 as its tag due to the solid arrow 139 between the two nodes.

(2). A db-term. For example, Node 132 has the integer 2 as the tag.

Figure 7:
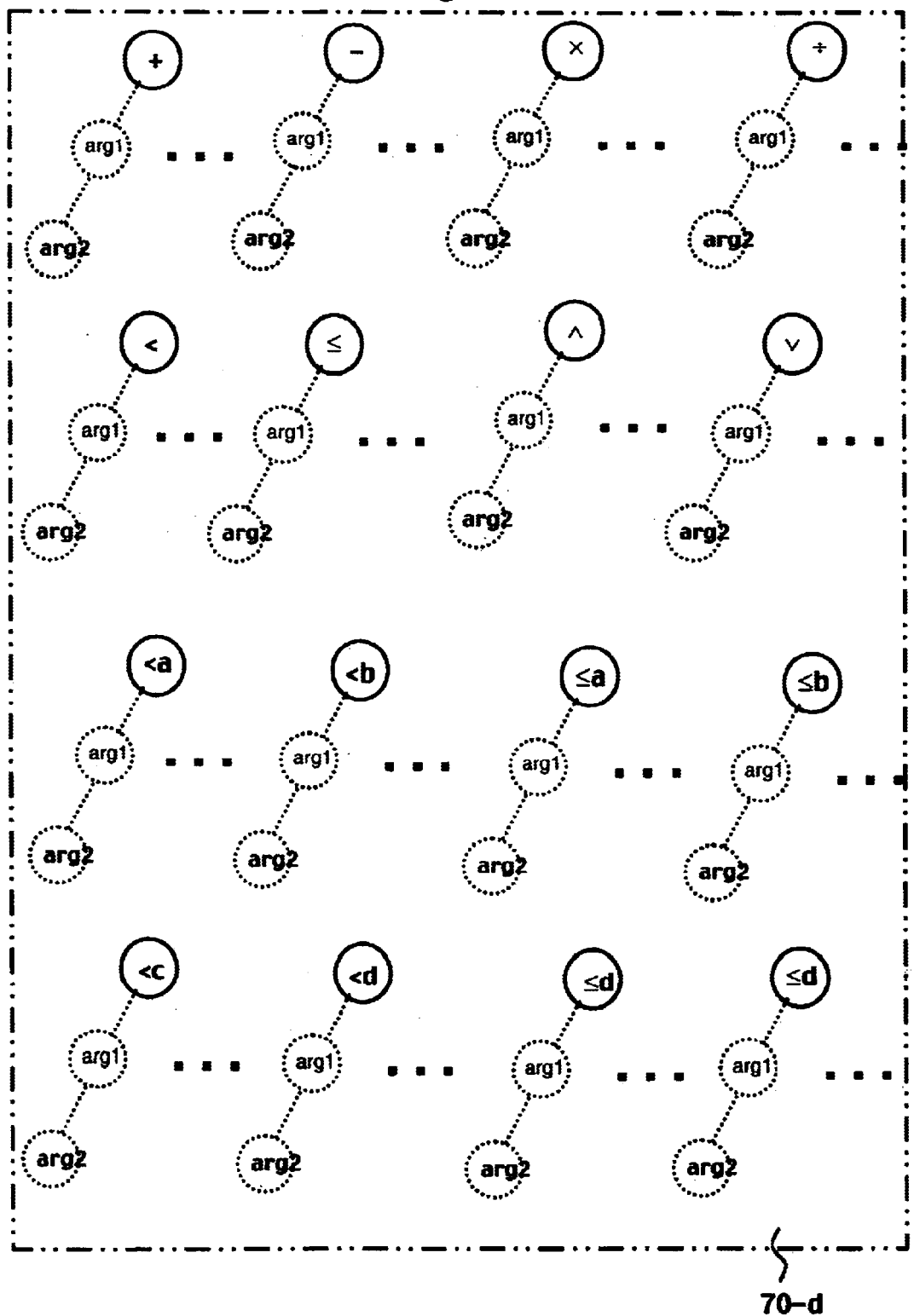
FIG. 7 shows a part of the built-in functions of the database 70 in FIG. 1.
Figure 8:
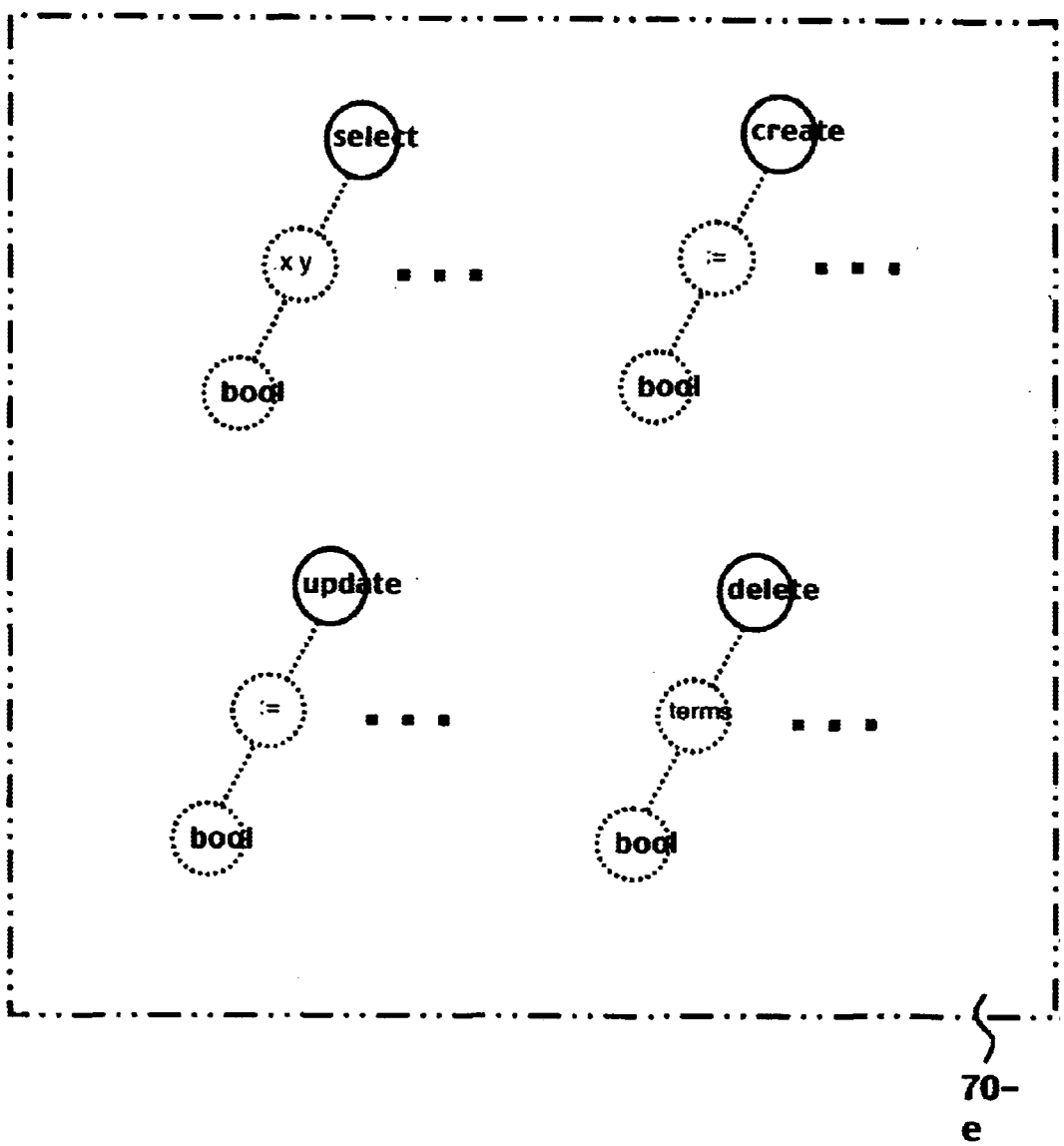
FIG. 8 shows a part of the built-in functions of the database 70 in FIG. 1.

(3). A built-in constant functions. For example, integer/floating numeric numbers, date, time, the arithmetic operator+, the boolean operator<, more boolean operators to be discussed late, and a special constant labeled "Undefined" are constant functions. Rather than their labels, the constant functions refer to the semantic meanings supported by additional processes. In FIGS. 7 and 8 demonstrate a few constant functions. Note that a node with a constant function as the tag is a leaf node. The dashed up-down links and dashed nodes in FIGS. 7 and 8 are not a physical, but logic illustration of the computing behaviors of the constant functions.

(4). A third-party software. Examples are multimedia (video/audio) data, a file in operating systems, and a program in software engineering. A node with a third-party software as the tag shall be able to present the value in its nature form as a constant function does. For example, a node with its value of a sound shall have its facility such as computer program that drives to perform the sound. A node with a third-party software as the tag is a leaf node.

Each node in Database 70 has a name. Given a node in Database 70, its name is formed in the following method:

(1). If a node is a root, its name is the label of the node itself. For example, the name of Node 131 is Root.

(2). If the node with label L is a non-root node, and inductively it is assumed that the name of the superior of the node is S, then the name of the node is S L. For example, Node 132 has the name Root 4; and Node 159 in FIG. 5 has the name College CS CS101.

(3). If the node without label, but inductively the names of its superior and its parent are S and P respectively, then the name of the node is S (P). When P is a label, the parentheses can be ignored. For example, Node 134 has the name C SQ; Node 142 has the name C SQ SQ; Node 160 has the name College Admin (SSD John); and Node 161 has the name College CS CS 101 (College Admin (SSD John)).

When a db-term is the name of a node, the db-term is used to refers to the node; and the node representing the db-term in the rest of the description of this invention. For example, it is identical to say that Node 132 is the db-term Root 4; and the db-term Root 4 is Node 132.

The labels are further classified with the followings:

(1). Variable labels (or simply called variables). A label x is declared as a variable if it appears right after the delimiter $\lambda$ in an abstraction. The entire body M of the abstraction $\lambda$x. M is the scope of $\lambda$x. Variable x occurs free in a db-term N if x is not in the scope of a $\lambda$x in N; x occurs bound otherwise. For example in the db-term $\lambda$x. (x+y), x and y are variables; and x occurs bound and y occurs free. In Database 70, a variable can only be the label of a leaf node whose tag is the body of the abstraction. An example is the presentation of the factorial function in FIG. 6.

(2). Proposition labels. All the labels other than variables are the proposition labels. A proposition label is to symbolize a data (function) of Database 70.

There are the following types of proposition labels representing data (functions) in Database 70:

(1). Constant labels symbolizing built-in data or functions in Database 70. They comprise the special constant "Undefined"; numerals like 123 and 123.4; arithmetic operators like +, −, ×, /; boolean operators like <, ≦, ∧, ∨, <a, <b, <c, <d, ≦a, ≦b, ≦c, ≦d, =; and special operators like select, create, update, delete. Some of constant functions with labels are illustrated in FIG. 7 and FIG. 8. More discussion about them will be done late.

(2). The rest of the character strings other than the constant labels. They are called app-data labels. They symbolize application-oriented data. For example, All the alphabetic strings like "College", "SQ, and "fac" in FIGS. 4, 5, and 6 are app-data labels, and they symbolize the application data. And further different from constant labels, the app-data labels have their symbolized functions dynamically changeable from a state to another of Database 70. All the strings other than constant labels in Database 70 are app-data labels. All the infinite labels not in Database 70 are equal to Undefined, but some of them may become meaningful functions when they appear in Database 70 with a state as it will be seen late. For example, "Garbage" is not in Database 70 as given in FIGS. 4, 5, and 6, then Garbage will be equal to Undefined as it will be described in the computing process in FIG. 9-a and FIG. 9-b. Some app-data labels may symbolize third-party software.

A db-term is called closed if there is no any free variable in it. For example, x+y is not a closed db-term while $\lambda$x.$\lambda$y. x+y is a closed db-term. For the detailed information about (free/bound) variables, (closed/open) terms, please reference "The Lambda Calculus—its Syntax and Semantics" by H. P. Barendregt, published by North-Holland in 1984.

For each db-term from Channel 40, Database and Process 50 will reference Database 70, and compute the value of the db-term. The computation (or called reduction) process from a db-term to its value is another preferred embodiment of this invention. The value (or called normal form) of a db-term is the db-term from which no other db-term can be computed (reduced). In other words, A value, as a db-term, doesn't have any redex as a sub db-term in the db-term.

Given Database 70, a db-term M is a redex if:

(1). M is a proposition label not appeared in Database 70.

(2). M is an application PQ, where P is a term appeared in Database 70, and Q is a closed db-term, but PQ is not a term appeared in Database 70.

(3). M is a β-redex, that is (λx.P)Q.

(4). M is a η-redex: λx.Mx where x is not a free variable of M.

When a db-term M can be reduced to another db-term N by a finite number of reduction steps, M is said to be equal to N (or denoted as M=N); or M and N are convertible. For example Root 4=2, or Root 4 and 2 are convertible in FIG. 4. As a preferred embodiment of this invention, FIG. 9-*a* and FIG. 9-*b* are the computing process of Data Process 50 including Computing Rules 60. This process converts arbitrary db-terms to their values.

Input 40 indicates that the process 60 accepts arbitrary db-terms M.

Operation Box 510 says that if M is a label defined in Database 70 with a tag value, then the value of the M is the tag of M. For example, Node 132 (Root 4) in FIG. 4 has the value 2, the tag of Node 132; and Node 162 (College CS Head) in FIG. 5 has the value 163 (SSD Mike), the tag of Node 162.

Operation Box 511 says that if M is a label not defined in Database 70, then the value of M is Undefined. For example, all the labels like "garbage" and "others" not appeared in Database 70 will have the value Undefined.

Operation Box 512 says that if M is a label defined in Database 70, but it has no tag, then the value of M is M itself. All the numerals have themselves as the values. And any node in Data 70 which has no tag and no subordinate has itself as the value.

Operation Box 515 says that if M is an abstraction λx.N, then evaluate N first by recursively calling the computing process illustrated in FIG. 9-*a* and FIG. 9-*b*. The value of M is the λx.N', where N' is the value of N after the evaluation. For example, λx.x+1+2 would be reduced to λx.x+3.

Operation Box 514 says that if M is a binary operation (N1 op N2), then the value of M is the result of the operation (N1 op N2). For example, 1+2 has the value 3. Binary operation expressions also could be expressed in the combinations of db-terms. Operations Box 520 and 521 say that if M is an combination N1 N2, then N1 and N2 are evaluated first by recursively calling the computing process in FIG. 9-*a* and FIG. 80-*b*. The outputs are M1 and M2 respectively. Evaluating N1 and N2 can be done simultaneously by showing Boxes 521 and 521 in parallel. For example, if M≡(λx.(x+(1+2)))(3+3) would have the first step of its evaluation: λx.x+1+2=λx.x+3 and 3+3=6.

Operation Box 522 says that if either M1 or M2 is Undefined, then the value of M is Undefined. For example, Undefined 5=Undefined; and 5 Undefined=Undefined.

Operation 524 says that if M1 is an abstraction M1≡λx.N, and then replace the occurrences of x in N with M2; and evaluate the substituted db-term N[x:=M2] by recursively calling the computing process in FIG. 9-*a* and FIG. 9-*b*. For example, if M1≡λx.x+3 and M2≡6. Then (x+3)[x:=M2] ≡(6+3). After evaluating (6 +3), the return value would be 9.

Operation 525 says that if either M1 or M2 (or both) is (are) not closed db-terms, then the combination M1 M2 return itself as the value. For example, SQ (x+3) has itself as the value since it cannot be reduced when there is a free variable in it.

Operation 526 says that if M1 is in Database 70, and there is a M2' in Database 70 such that M2' and M2 have the same value, and M1 M2' is in Database 70, then M is reduced to the tag of M1 M2' if M1 M2' has a tag. For example, Root (2+2) could be reduced to Root 4 since 2+2 and 4 have the same value 4; and Root 4 (Node 132) is defined in Database 70-*a*. After further evaluating Root 4 has the value the tag 2 as its value. In FIG. 5, College CS Head is Node 162 and Node 162 has the tag of the solid arrow 164 pointing to Node 163. Then the db-term College CS Head is reduced to SSD Mike.

Operation 528 says that if M1 is in Database 70, and there is a M2' in Database 70 such that M2' and M2 have the same value, and M1 M2' is in Database 70, then M has the value of M1 M2' if M1 M2' has no tag. For example in FIG. 5, Node 158 is the db-term (College CS) and it has no tag. Then the db-term (College CS) has itself as the value.

Operation Box 529 says that if M1 is in Database 70 and it has a variable x as its subordinate; and further if M2 is in the range of x, then substituting x in the tag of the subordinate with M2 to the tag is the value of the M1 M2. Note that a node with a variable as the label has the body of an abstraction as the tag. For example in FIG. 6, fac 3 would be reduced to (n*fac(n−1))[n:=3]≡3*fac(3−1).

Operation Box 527 says that if M1 is in Database 70 and there is no (M1 M2') in Database 70 such that M2≡M2'; and further M1 has no subordinate with a variable tag such that M2 is in the range of the variable, then Undefined is the value of M1 M2. For example, SQ 5=Undefined in FIG. 4; SSD Nobody=Undefined; and fac non_integer=Undefined.

As a comprehensive example, the db-term College Admin (SSD John) Major Head has the following computing steps:

College Admin (SSD John) Major Head
=(College Admin)(SSD John) Major Head—by the operation box 528 in FIG. 9
=((College Admin)(SSD John)) Major Head—by the operation box 528 in FIG. 9
=(College CS) Head—by the operation box 526
=SSD Mike—by the operation box 526

As the second example, the db-term fac 3 has the following computing steps towards it value:

Fac 3=(n*fac(n−1))[n:=3]=3*(fac 2)—by the operation box 524.
=3*((n*fac(n−1))[n:=2])=3*2*(fac 1)—by the operation box 524.
=3*2*((n*fac(n−1))[n:=1])=3*2*1*(fac 0)—by the operation box 524.
=3*2*1*1—by the operation box 526.

In the discussion above, it is logically assumed that Database 70 comprises a infinite number of constants, built-in functions, and the related virtual subordinates of the built-in functions. For example, 000.3 and +3 3 are logically a part of Database 70 although they don't show in Database 70. For the nodes in FIGS. 7 and 8 have infinite number of logic subordinates as indicated. Some of the built-in functions are illustrated in FIGS. 7 and 8. Here is a summary:

(1). Undefined. Undefined means meaningless or undefined as a result of a computation. For example, College Math would be reduced to Undefined according to Operation Box 527 since College Math is not a node in FIG. 5. Applying Undefined to any db-term; or applying any db-term to Undefined is reduced to Undefined as shown in Operation Box 522.

(2). Numeral numbers. For example the numerical string "123", "−123.4" symbolize the integer 123, and the negative floating number −123.4. There is a infinite number of numeral numbers. They may not physically be stored in Memory Space 80; but they are logically available in Database 70.

(3). Boolean values "True" and "False". They have their usually meanings in mathematics or programming languages. Further, applying any db-term to True or False would be reduced to Undefined.

(4). Built-in binary operator '<' as shown in FIG. 7. It takes two numerical numbers v1 and v2 as parameters, compares the values of the two numbers, and return True if v1 is greater than v2; and False otherwise. Applying other types of db-terms to '<' would be reduced to Undefined. If there is any variable among v1 and v2, the value of the expression (v1<v2) is itself.

(5). Built-in binary operator '+' as shown in FIG. 7. It takes two numerical numbers v1 and v2 as parameters, returns the sum of v1 and v2. Applying other types of db-terms such as alphabetic strings to '+' would be reduced to Undefined. If there is any variable among v1 and v2, the value of the expression (v1+v2) is itself.

(6). Built-in binary operator '<a' as shown in FIG. 7. It takes two db-terms t1 and t2 as parameters. If there is an up-down link with the up-side node t2 to the down-side node t1 in Database 70, then t1 <a t2 returns True; and False otherwise. If there is any variable among t1 and t2, the value of the expression (t1 <a t2) is itself. For example, SQ 2 <a SQ is True in FIG. 4; College CS Head <a College CS is True in FIG. 5; and SQ 5 <a SQ is False in FIG. 4. The two parameters of <a shall not be evaluated by the computing process of FIG. 9-a and FIG. 9-b. Instead, they are not converted to other forms before passing to <a as parameters.

(7). Built-in binary operator '<b' as shown in FIG. 7. It takes two db-terms t1 and t2 as parameters. If there is a dash-arrow with the head node t2 and the tail node t1 in Database 70, then t1 <b t2 returns True; and False otherwise. If there is any variable among t1 and t2, the value of the expression (t1 <a t2) is itself. For example, C SQ <b SQ is True in FIG. 4; College Admin (SSD John) <b SSD John is True in FIG. 5; and C Root <b Root is False in FIG. 4. The two parameters of <b shall not be evaluated by the computing process of FIG. 9-a and FIG. 9-b. Instead, they are not converted to other forms before passing to <b as parameters.

(8). Built-in binary operator '<a' as shown in FIG. 7. It takes two db-terms t1 and t2 as parameters. If there is a sequence of up-down links which connect t1 as the lowest node of the sequence and t2 as the highest node of the sequence, then t1 <a t2 returns True; and False otherwise. If there is any variable among t1 and t2, the value of the expression (t1 ≦a t2) is itself. For example, SQ ≦a SQ is True; SQ 2 ≦a SQ is True in FIG. 4; College CS Head ≦a College is True in FIG. 5; and SQ 5 ≦a SQ is False in FIG. 4. The two parameters of ≦a shall not be evaluated by the computing process of FIG. 9-a and FIG. 9-b. Instead, they are not converted to other forms before passing to ≦a as parameters.

(9). Built-in binary operator '≦b' as shown in FIG. 7. It takes two db-terms t1 and t2 as parameters. If there is a sequence of dash-arrows which connect t1 as the deepest tail node of the sequence and t2 as the top head node of the sequence, then t1 ≦b t2 returns True; and False otherwise. If there is any variable among t1 and t2, the value of the expression (t1 <a t2) is itself. For example, C SQ ≦b SQ is True in FIG. 4; College Node 161–(CS CS101 ((College Admin (SSDJohn))) ≦b Node 165–(SSD John) is True in FIG. 5. The two parameters of ≦b shall not be evaluated by the computing process of FIG. 9-a and FIG. 9-b. Instead, they are not converted to other forms before passing to ≦b as parameters.

(10). Built-in binary operator '<c' as shown in FIG. 7. It takes two db-terms t1 and t2 as parameters. If there is another db-term t such that t2 t=t1, then t1<c t2 is True, and it is False otherwise. For example in FIG. 4, C SQ Root <c C SQ and I <c C SQ are True; Root 4 <c Root and 2 <c Root are True. In FIG. 5, SSD Mike <c College CS is True; College CS <c College Admin (SSD John) is True; and A <c College CS CS101 (College Admin (SSD John)) is True. If there is any variable among t1 and t2, the value of the expression (t1 <c t2) is itself. Given any two db-terms t1 and t2, if t1 <a t2, then t1 <c t2 must be True. As a matter of fact, if t1 <c t2 is True, there is a directed path consisting of one up-down link and zero or multiple solid arrow(s). Starting from t2 along the path, one always walks through the up-down link by starting with the up-side node; walks through a solid arrow by starting either its tail node or its head node; and eventually reaches t1.

(11). Built-in binary operator '<d' as shown in FIG. 7. It takes two db-terms t1 and t2 as parameters. If there is another db-term t such that t t2=t1, then t1<t2 is True, and it is False otherwise. For example in FIG. 4, C SQ Root <d Root and I <d Root are True; Root 4 <d 4 and 2 <d 4 are True. In FIG. 5, College CS Head <d Head is True; and therefore SSD Mike <d Head is True. If there is any variable among t1 and t2, the value of the expression (ti <d t2) is itself. Given any two db-terms t1 and t2, if t1 <b t2, then t1 <d t2 must be True. As a matter of fact, if t1 <d t2 is True, there is a directed path consisting of one dash arrow and zero or multiple solid arrow(s). Starting from t2 along the path, one always walks through the dash arrow by starting with the head node; walks through a solid arrow by starting either its tail node or its head node; and eventually reaches t1.

(12). Built-in binary operator '≦c' as shown in FIG. 7. It takes two db-terms t1 and t2 as parameters. If there is zero or more than one db-terms s0, s1, . . . , sn such that t2 s0 s1 . . . sn=t1, then t1 ≦c t2 is True, and it is False otherwise. For example in FIG. 4, C SQ Root ≦c C and I ≦c C are True; Root 4 ≦c Root and 2 ≦c Root are True. In FIG. 5, SSD Mike ≦c College is True; College CS ≦c College Admin is True; and A ≦c College is True. If there is any variable among t1 and t2, the value of the expression (t1 ≦c t2) is itself. Given any two db-terms t1 and t2, if t1 <a t2, then t1 ≦c t2 must be True. As a matter of fact, if t1 ≦c t2 is True, there is a directed path consisting of zero or multiple up-down link(s) and zero or multiple solid arrow(s). Starting from t2 along the path, one always walks through a up-down link by starting with the up-side node; walks through a solid arrow by starting either its tail node or its head node; and eventually reaches t1.

(13). Built-in binary operator '≦d' as shown in FIG. 7. It takes two db-terms t1 and t2 as parameters. If there is zero or more than one db-terms s0, s1, . . . , sn such that (t2 (s0 (s1 . . . (sn t2) . . . )))=t1, then t1 ≦d t2 is True, and it is False otherwise. For example in FIG. 4, C SQ Root ≦d Root and I ≦d Root are True; Root 4 ≦d 4 and 2 ≦d 4 are True. In FIG. 5, College CS CS101 ((College Admin (SSD John)) ≦d SSD John is True. If there is any variable among t1 and t2, the value of the expression (t1 ≦d t2) is itself. Given any two db-terms t1 and t2, if t1 ≦b t2, then t1 ≦d t2 must be True. As a matter of fact, if t1 <d t2 is True, there is a directed path consisting of zero or multiple dash arrow(s) and zero or multiple solid arrow(s). Starting from t2 along the path, one always walks through a dash arrow by starting with the head node; walks through a solid arrow by starting either its tail node or its head node; and eventually reaches t1.

(14). Select as shown in FIG. 8. A format of expressing a selection statement is: "select x1 x2 . . . xn where bool-expression". Under Database 70, a selection expression returns a set of sequences of db-terms such that the "bool-expression" is evaluated to be True for each sequence output when the sequence of the variables x1 x2 ... xn are substituted with the sequence of the db-terms output.

(15). Update as shown in FIG. 8. A format of expressing a selection statement is: "select t1:=t1, t2:=t2', ... ,tn:=tn' where bool-expression". Under Database 70, an update expression updates the values of a set of sequences of db-terms with t1', t2', ... , and tn'. For each sequence of the db-terms, the "bool-expression" is evaluated to be True when the sequence of the variables t1 t2 ... tn are substituted with the sequence.

(16). Delete as shown in FIG. 8. A format of expressing a deletion statement is: "delete x1, x2, ... , xn where bool-expression". Under Database 70, a deletion expression delete all the related nodes in the database 70 satisfying the "bool-expression". For more information, please reference "System and Method for Storing and Managing Functions" by Kevin Houzhi Xu in U.S. Pat. No. 5,995,958. issued on Nov. 30, 1999.

(17). Create as shown in FIG. 8. A format of expressing a create statement is: "create t1:=t1, t2:=t2', ... ,tn:=tn' where bool-expression". Under Database 70, an creation expression creates a set of sequences of db-terms and assigns them values if necessary. For each sequence of the db-terms, the "bool-expression" is evaluated to be True when the sequence of the variables t1 t2 ... tn are substituted with the sequence.

Figure 10:
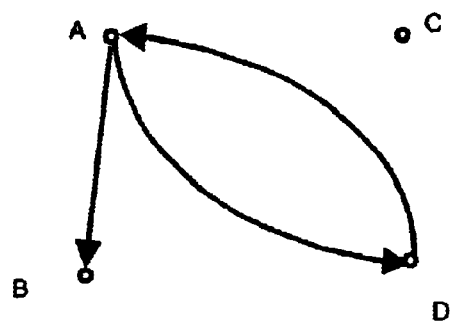
FIG. 10 gives a directed graph.
Figure 11:
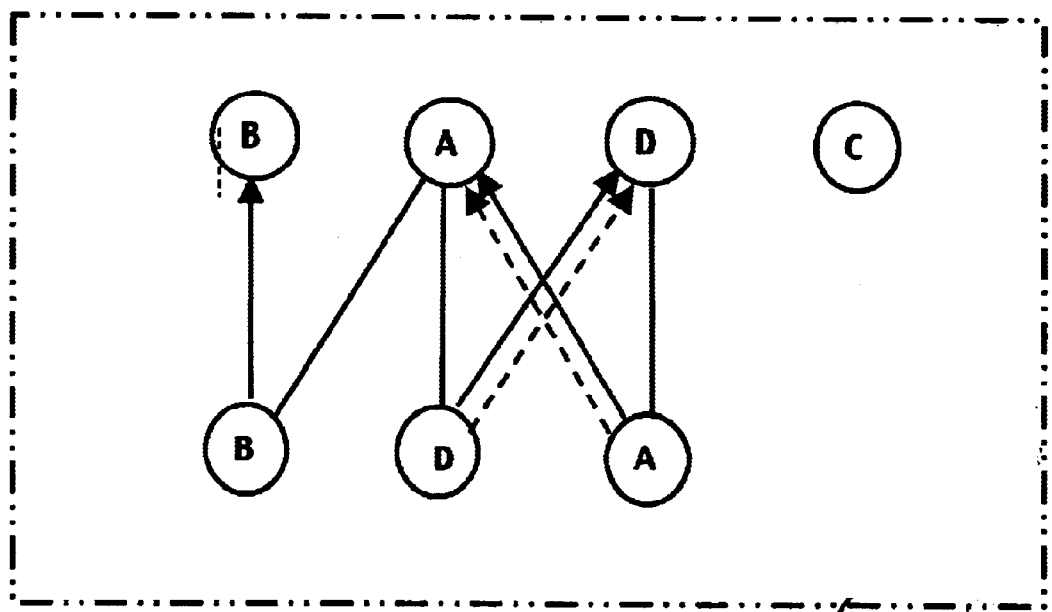
FIG. 11 shows the database presentation of the directed graph in FIG. 10.

As a comprehensive example, the directed graph in FIG. 10 has the expression: $B \leq_c D$, for the query "Is there a path from D to B?". The database presentation of the directed graph is given in FIG. 11.

With the above set of build-in functions, the data manipulating operations and query operations will be very powerful.

Figure 1:
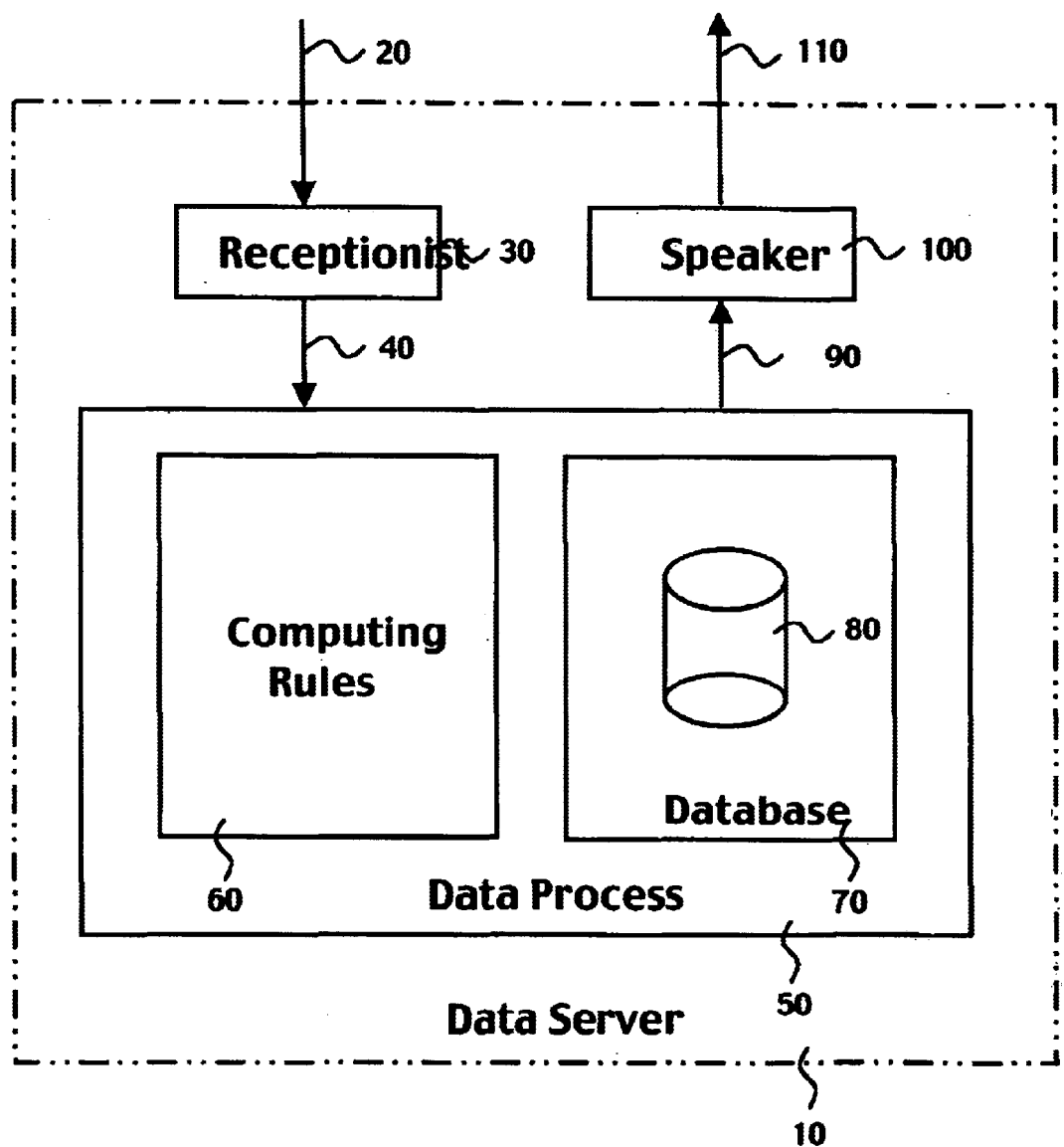
FIG. 1 shows the system architecture of database servers, where no additional software beyond the database management systems is needed for arbitrary database applications.

Speaker 100 in FIG. 1 takes db-terms from channel 90 and responds clients with the outputs 110 converted from the db-terms in the formats the clients need.

CONCLUSION

Accordingly, readers will see that the data server of this invention can store arbitrary data and accept arbitrary requests in a uniform framework under the scope of effectively computable functions. The uniform framework is an extended lambda calculus where db-terms are sufficient form of representing data and expressing queries. A set of boolean binary operators stemming from function/argument/value relationships of higher-order functions can be used to express fixpoint queries. This improves the computing automations of database applications in the sense that application-dependent software (including application-dependent constraints, application query interpreter, and data interpreter) is not needed. High computing automation immediately implies the lower cost of database applications, shorter development-life cycle, high system reliability.

Although the description above contains many specifications, these should not be construed as limiting the scope of the invention but as merely providing illustrations of some of the presently preferred embodiments of this invention. Thus the scope of the invention should be determined by the appended claims and their legal equivalents, rather than by the examples given.

I claim:

1. An apparatus having input/output means; memory means; and CPU means, comprises a database with a plurality of nodes; a plurality of up-down links; a plurality of dash arrows; a plurality of solid arrows, each of said up-down links being a means supported by said memory that has an up end connecting to a node selected from said nodes and a down end connecting another node selected from said nodes, each of said dash arrows being a means supported by said memory that has a tail connecting to a node selected from said nodes and a head connecting another node selected from said nodes, each of said solid arrows being a means supported by said memory that has a tail connecting to a node selected from said nodes and a head connecting another node selected from said nodes, each of said nodes being connected by the up ends of zero or more links selected from said up-down links; being connected by the down end of zero or one link selected from said up-down links; being connected by the heads of zero or more arrows selected from said dash arrows; being connected by the heads of zero or more arrows selected from said solid arrows, each of the nodes (or the root nodes) which are not connected by the down ends of a plurality of links selected from said up-down links having a label, and each of the nodes (or the non-root nodes) which are connected by the down end of exactly one link selected from said up-down links being connected by the tail of exactly one arrow selected from said dash arrows; and a receptionist which accepts requests from other apparatus or users, and converts said requests to db-terms.

2. The apparatus of claim 1 wherein each of the nodes (or the leaf nodes) which are not connected by the up ends of a plurality of links selected from said up-down links is connected by the tail of exactly one solid arrow selected from said solid arrows; or has one tag, said tag being a means supported by said memory that references a db-term; a third party software; or nothing.

3. The apparatus of claim 1 further comprises a computing processor which converts a db-term to another db-term, said computing processor having a plurality of rules selected from a group comprising:

a. if the db-term is the name of a non-leaf node selected from said nodes, said computing processor does not convert;

b. if the db-term is the name of a leaf node connected by the tail of a solid arrow, said computing processor converts the db-term to the name of a node collected by the head of said solid arrow; if the db-term is the name of a leaf node having a tag referencing a db-term, said computing processor converts the db-term to the value of said referenced db-term; and if the db-term is the name of a leaf node having a tag referencing nothing, said computing processor converts the db-term to the db-term itself;

c. if the db-term is a label not appeared in said database, said computing processor converts the db-term to Undefined;

d. if the db-term is a combination of a second db-term and a third db-term, if the second db-term is the name of a node in said database, and if said node has a subordinate whose parent has the name of a fourth db-term such that the third db-term and the fourth db-term can be converted to the same fifth db-term, then said computing processor converts the db-term to the combination of the second db-term and the fourth db-term;

e. if the db-term is a combination of a second db-term and a third db-term, if the second db-term is the name of a node in said database, and if said node has a fourth variable db-term as a subordinate such that the third db-term is in the range of the fourth variable db-term, then said computing processor converts the db-term to a fifth db-term resulted from the tag of said subordinate by substituting said variable with the third db-term;

f. if the db-term is a combination of a second db-term and a third db-term, if the second db-term is the name of a node in said database, if said node doesn't have a subordinate such that either the name of the parent of said subordinate and the third db-term is convertible; or said subordinate has a fourth variable as its label and the third db-term is in the range of said variable, then said computing processor converts the db-term to Undefined;

g. if the db-term is a combination of a second db-term and a third db-term, if the second db-term is an abstraction, then said computing processor converts the db-term to the fourth db-term resulted from the body of the third abstraction by substituting the variable of said abstraction with the third db-term.

4. The apparatus of claim 1 wherein said database further comprises a plurality of root nodes having functions as tags selected from a group comprising:

a. arithmetic operators 'addition', 'subtraction', 'multiplication', and 'divide' which take two numeral numbers as parameters;

b. boolean operators 'greater than', 'equal or greater than', and 'equal' which take two numeral numbers as parameters;

c. boolean operators 'and', 'or', and 'not' which take boolean operation expressions as parameters;

d. boolean operator 'subordinate-of-superior' which takes two db-terms as parameters; and return the value of True if the two db-terms are the names of a first node and a second node respectively in said database and there is a link of the first link type with the tail connected to the first node and the head connected to the second node;

e. boolean operator 'child-of-parent' which takes two db-terms as parameters; and returns the value of True if the two db-terms are the names of a first node and a second node respectively in said database and there is a link of the second link type with the tail connected to the first node and the head connected to the second node;

f. boolean operator 'subordinate-of-subordinate' which takes two db-terms as parameters; and returns the value of True if the two db-terms are the names of a first node and a second node in said database and there is a sequence of links of the first link type along which one can walk from the first node connected by the tail of the very end link of the sequence to the second node connected by the head of the other very end link of the sequence;

g. boolean operator 'child-of-child which takes two db-terms as parameters; and returns the value of True if the two db-terms are the names of a first node and a second node in said database and there is a sequence of links of the second link type along which one can walk from the first node connected by the tail of the very end link of the sequence to the second node connected by the head of the other very end link of the sequence;

h. boolean operator 'value-of-function' which takes two db-terms as parameters; and returns the value of True if the two db-terms are the names of a first node and a second node in said database and there is a path between the first node to the second node consisting of one link of the first link type and zero or multiple links of the third link type along which one can walks from the first to the second node; and along which one walks through said link of the first link type from the tail to the head;

i. boolean operator 'image-of-argument' which takes two db-terms as parameters; and returns the value of True if the two db-terms are the names of a first node and a second node in said database and there is a path between the first node to the second node consisting of one link of the second link type and zero or multiple links of the third link type along which one can walks from the first to the second node; and along which one walks through said link of the second link type from the tail to the head;

j. boolean operator 'value-of-value' which takes two db-terms as parameters; and returns the value of True if the two db-terms are the names of a first node and a second node in said database and there is a path between the first node to the second node consisting of zero or multiple links of the first link type and zero or multiple links of the third link type along which one can walks from the first to the second node; and along which one walks through each of said links of the first link type from the tail to the head;

k. boolean operator 'image-of-image' which takes two db-terms as parameters; and returns the value of True if the two db-terms are the names of a first node and a second node in said database and there is a path between the first node to the second node consisting of zero of multiple links of the second link type and zero or multiple links of the third link type along which one can walks from the first to the second node; and along which one walks through each of said links of the second link type from the tail to the head;

l. operator 'select' which takes a sequence of variables and a boolean expression as parameters; and returns a set of db-terms each of which satisfies said boolean expression;

m. operator 'update' which takes a sequence of assignments and a boolean expression as parameters; and returns the value of True when all the nodes which satisfy said boolean expression are correspondingly updated with the values of said assignments n. operator 'delete' which takes a db-term and a boolean expression as parameters; and returns the value of True when all the nodes which satisfy said boolean expression are correspondingly deleted from said database;

o. operator 'create' which takes a sequence of assignments and a boolean expression as parameters; and returns the value of True when all the nodes satisfying said boolean expression are created and assigned the value of said assignment correspondingly in said database.

* * * * *